(12) United States Patent
Grimm et al.

(10) Patent No.: US 8,191,795 B2
(45) Date of Patent: Jun. 5, 2012

(54) METHOD AND SYSTEM TO CONTROL FLOW FROM INDIVIDUAL NOZZLES WHILE CONTROLLING OVERALL SYSTEM FLOW AND PRESSURE

(75) Inventors: Jeff Grimm, Hiawatha, KS (US); Kent Dieball, Stillwater, OK (US); Duane Needham, San Francisco, CA (US); Tyron Johnson, Coffeyville, KS (US); Marvin Stone, Stillwater, OK (US)

(73) Assignee: Capstan Ag Systems, Inc., Topeka, KS (US)

( * ) Notice: Subject to any disclaimer, the term of this patent is extended or adjusted under 35 U.S.C. 154(b) by 497 days.

(21) Appl. No.: 12/533,486

(22) Filed: Jul. 31, 2009

(65) Prior Publication Data
US 2010/0032492 A1  Feb. 11, 2010

Related U.S. Application Data

(60) Provisional application No. 61/085,772, filed on Aug. 1, 2008.

(51) Int. Cl.
*B05B 17/00* (2006.01)
*A01G 27/00* (2006.01)

(52) U.S. Cl. ......... 239/1; 239/67; 239/69; 239/159; 239/170; 239/172; 239/551; 239/566; 700/283

(58) Field of Classification Search ............ 239/61, 239/67, 69, 1, 11, 68, 159, 170, 172, 550, 239/551, 562, 566; 700/283, 284; 701/50
See application file for complete search history.

(56) References Cited

U.S. PATENT DOCUMENTS

| | | | |
|---|---|---|---|
| 4,220,998 A * | 9/1980 | Kays | 700/283 |
| 4,630,773 A | 12/1986 | Ortlip | |
| 4,637,547 A * | 1/1987 | Hiniker et al. | 239/1 |
| 5,134,961 A | 8/1992 | Giles et al. | |
| 5,653,389 A | 8/1997 | Henderson et al. | |
| 5,704,546 A | 1/1998 | Henderson et al. | |
| 5,884,205 A | 3/1999 | Elmore et al. | |
| 5,919,242 A | 7/1999 | Greatline et al. | |
| 5,967,066 A | 10/1999 | Giles et al. | |
| 6,510,367 B1 * | 1/2003 | McQuinn | 239/159 |
| 6,522,948 B1 | 2/2003 | Benneweis | |
| 6,786,425 B2 * | 9/2004 | Rawlings | 239/67 |
| 6,810,315 B2 | 10/2004 | Cessac | |
| 6,813,544 B2 | 11/2004 | Hood et al. | |

(Continued)

*Primary Examiner* — Steven J Ganey
(74) *Attorney, Agent, or Firm* — Dority & Manning, P.A.

(57) ABSTRACT

A method and system has been developed to individually control the flow of liquid products from any nozzle within a plurality of nozzles using pulse width modulated solenoid actuated valves residing on a CAN communication network. The CAN communication network has been further developed to manage the high current requirements of the solenoid actuated valves, the large physical length and high number of nozzles used on modern agricultural application equipment and integration and retrofit requirements when used in conjunction with commercially available application rate control devices. The method and system simultaneously controls multiple flow and shutoff related inputs including but not limited to turn radius, nozzle overlap, swath reduction, nozzle spacing, fence row rates, wheel track rates, etc. The method and system will also simultaneously accept one or more external inputs from commercially available application rate control devices where other rate and shutoff inputs may be used, for example, variable rates per boom section based on GIS maps or multiple in-field sensors along the boom. The method and system further incorporates the artificial manipulation of commercial rate controller inputs and outputs to facilitate these individual nozzle control features and benefits without compromising the overall system flow control performed by the commercial rate controller.

40 Claims, 13 Drawing Sheets

U.S. PATENT DOCUMENTS

| | | |
|---|---|---|
| 6,887,675 B1 | 5/2005 | Luo et al. |
| 6,928,339 B2 | 8/2005 | Barker |
| 6,941,225 B2 | 9/2005 | Upadhyaya et al. |
| 7,054,731 B1 | 5/2006 | Lange et al. |
| 7,066,402 B2 * | 6/2006 | Goebel et al. .................. 239/551 |
| 7,079,981 B2 | 7/2006 | Keller et al. |
| 7,103,451 B2 | 9/2006 | Seal et al. |
| 7,162,961 B2 | 1/2007 | Grimm et al. |
| 7,184,859 B2 | 2/2007 | Hood et al. |
| 7,311,044 B1 | 12/2007 | Hirst et al. |
| 7,383,114 B1 | 6/2008 | Lange et al. |
| 7,398,137 B2 | 7/2008 | Ferguson et al. |
| 7,502,665 B2 | 3/2009 | Giles |
| 2006/0273189 A1 | 12/2006 | Grimm et al. |
| 2008/0086249 A1 | 4/2008 | Lange |

* cited by examiner

Manipulated Flow Signal Transmitted from Invention to Rate Controller (15) = Flow Signal Intercepted from Flow Sensor (16) X Sum of Expected Values (8) / Sum of Actual Values (9)

FIG. 2

| Calculated Flow Value Transmitted from Invention to Rate Controller (17) | = | Flow Constant for Nozzle and Product Applied (18) | X | Square Root of Inlet-Outlet Nozzle Pressure (19) | X | Sum of Pulse Duty Cycle Percentages (11) |

FIG. 3

Location Setup Table

| VCM Serial Number | | | Nozzle Location | | Nozzle ON/OFF |
|---|---|---|---|---|---|
| 1706655 | #1 | 1 | −370" | #9 | ☐ |
| 1700359 | #2 | 2 | −390" | #8 | ☐ |
| 713474 | #3 | 3 | −410" | #7 | ☐ |
| 713789 | #4 | 4 | −430" | #6 | ☐ |
| 1701711 | #5 | 5 | −450" | #5 | ☐ |
| 1693944 | #6 | 6 | −470" | #4 | ☐ |
| 1694637 | #7 | 7 | −490" | #3 | ☐ |
|  |  | 8 | −510" | #2 | ☐ |
|  |  | 9 | −530" | #1 | ☐ |

Press the ESC or Location Setup key to exit.

FIG. 8

| System Setup | |
|---|---|
| 1 Language | English |
| 2 Units | English |
| 3 Operation Mode | Sharp Shooter |
| 4 Hour Meter | 0.0 Hours |
| 5 Clear Overlap Memory | Empty |
| 6 Scrolling Enable / Disable | Enabled |
| 7 Display Backlight | 5 |
| 8 LED Brightness | 5 |
| 9 Beeper Volume | 4 |
| 10 Valve Diagnostics Enable | No |

FIG. 10

METHOD AND SYSTEM TO CONTROL FLOW FROM INDIVIDUAL NOZZLES WHILE CONTROLLING OVERALL SYSTEM FLOW AND PRESSURE

RELATED APPLICATIONS

The present application is based upon and claims priority to U.S. Provisional Patent Application No. 61/085,772, filed on Aug. 1, 2008.

BACKGROUND

Commercially available independent flow and pressure control systems for dispensing agrochemicals onto fields exist and are well documented in the prior art. These systems utilize a plurality of solenoid actuated valves that pulse according to a on/off ratio which determines the flow from the group of nozzles at any given pressure. Therefore, the pressure of the system can be controlled for such parameters as droplet size, system flow capacity, stream dynamics, injection penetration, etc., while the flow of the system is independently controlled for such parameters as application rate (gallons/acre). These systems are commercially available for agricultural liquid applications of pest control sprays and crop nutrient systems. All nozzles within these existing commercial systems pulse together at the same rate.

Such systems for dispensing agrochemicals as described above are described, for instance, in U.S. Pat. No. 5,967,066 and in U.S. Pat. No. 7,502,665, which are incorporated herein by reference. The systems described in the above patents include a liquid reservoir for containing an agrochemical placed in communication with a plurality of valves positioned on a boom. In the '665 patent, a networked delivery system is described that includes a communication network to establish operative communication between individual device nodes and a central operator interface. In the '665 patent, for instance, a plurality of vibration sensors can be located adjacent to respective nozzles or valves that indicate to the operator whether the valves are operating properly.

The systems described in the '066 patent and in the '665 patent represent great advances in the art. Although the systems described in the above patents, however, suggest controlling the application rate of the agrochemical based on individual solenoid valves, various improvements in the art are still needed.

In particular, a need currently exists for an improved system and method for controlling individual valves or groups of valves for varying application rates. A need also particularly exists for such a control system that is capable of being retrofitted onto existing systems.

SUMMARY

The present disclosure is generally directed to an improved system and method for dispensing controlled amounts of a liquid agricultural product through a plurality of valves that are individually controlled or controlled in groups. In this manner, when the valves are spread across a boom, application rates can be varied across the width of the system in response to one or more conditions or parameters that may exist in the field. In one embodiment, for instance, the system can be designed so as to increase or decrease individual valve rates while controlling the overall rate at which the liquid agricultural product is applied to the field.

In one embodiment, for instance, the present disclosure is directed to a system for applying liquid agricultural products to a field. The system includes a plurality of individually controlled valves, such as pulse width modulated valves. The valves can be in communication with a nozzle or any other dispensing device that either sprays the agricultural product onto the field or injects the agricultural product into the soil. As used herein, a "liquid agricultural product" includes solutions, emulsions, dispersions, suspensions, and the like. The plurality of individually controlled valves are configured to emit the liquid agricultural product at a rate of volume per time.

The system further includes a controller in communication with each of the valves. The controller is configured to receive multiple flow related individual control values for each valve. The flow related individual control values can be operator inputted into the system or can be directly inputted into the system from a separate device, such as a sensor or a global positioning system. Each individual control value for each valve can be based upon a condition or parameter existing during application. In accordance with the present disclosure, the multiple individual control values can be multiplied together to create a multiplied value for each valve. The multiplied value can then be divided by an average of all the multiplied values to create a flow factor for each valve. The controller is configured to control the rate at which the liquid agricultural product is emitted from each valve based upon the calculated flow factor for each valve.

For example, in one embodiment, the rate that the liquid agricultural product is emitted from each valve can be based upon a duty cycle percentage that is controlled by the controller. The controller can be configured to receive a corporate duty cycle based upon an overall desired application rate of the liquid agricultural product. In order to control the individual valves, the controller can then be configured to multiply the flow factor for each valve by the corporate duty cycle percentage for calculating the duty cycle percentage for each individual valve.

In one particular embodiment, the plurality of valves can be designed to emit an overall application rate of the liquid agricultural product based upon volume of the product per area of land. The controller can be configured to vary the rate at which the liquid agricultural product is emitted from each valve based upon changing flow factors without changing the overall application rate of the agricultural product.

The controller, which may comprise any suitable programmable device such as a computer, may be configured to receive from several to many flow related individual control values. The flow related individual control values generally comprise unitless values that are related to a particular parameter or condition and are based upon the amount of the liquid agricultural product that is emitted by each valve. For a certain condition or parameter, the flow related individual control values from valve to valve are also proportional to each other.

Many different types of flow related individual control values can be inputted into the system either automatically or by an operator. One of the flow related individual control values, for instance, may comprise a valve turn radius that comprises a value based upon a speed of each valve while the valve is traversing along an arc of a turn. For instance, the valves can be spaced apart along a boom. When a vehicle carrying the boom makes a turn, certain valves will accelerate, while other valves will decelerate or even stop depending upon the radius of the turn. Each valve can be given a flow related control value based upon its position on the boom during the turn. This control value can then be used by the controller to either increase or decrease the amount of product being dispensed by the valve.

Other flow related individual control values can be based upon irregular valve spacing along the boom or may relate to swath overlap in order to avoid overapplying the agricultural product in certain areas. Swath overlap, for instance, may be predicted or determined from input received from the global positioning system. Swath overlap may also be based upon the vehicle's speed, turn radius, antennae offset, and the like. In one embodiment, for instance, a global positioning system may be used in conjunction with an electronic compass to determine swath overlap. The electronic compass, for instance, may be used to determine forward and backward orientation of the valves so as to accurately determine valve location for use in overlap determination.

In one particular embodiment, swath overlap may be determined by looking ahead along each predicted valve position, to the right of each predicted valve position, to the left of each predicted valve position and behind each predicted valve position according to a previously determined safety-margin distance for areas previously applied with the agricultural product. The system can be configured to turn the valves on or off depending on their predicted position relative to the previously applied areas based upon the safety-margin distance. The safety-margin distance can be operator controlled so as to prevent any overlap, or to create a controlled amount of overlap.

Many other flow related individual control values can also be inputted into the system. The flow control values, for instance, may relate to a vehicle affect. For instance, increased or decreased application rates for a particular valve may be needed due to wheel tracks, dust generation, air disturbance, or any other condition caused by the vehicle. In another embodiment, one or more of the flow related individual control values may be based on a field condition. For instance, application rates for certain valves may be increased or decreased due to the presence of fence rows, access roads, certain terrain features, previous land usages, and the like that may exist on the field being treated.

In still another embodiment, one or more of the flow related individual control values can be based upon a vegetative affect. For instance, one or more individual valves may be controlled by increasing or decreasing application rates due to a crop or weed density, a crop or weed health, a crop or weed species, a crop or weed sex, or the like.

As described above, the controller calculates a duty cycle percentage for each valve. In one embodiment, if any of the flow related individual control values for a valve are zero, then the controller can be configured to close the valve to prevent any agricultural product from being dispensed. In addition, the controller can be programmed with a pre-set minimum calculated duty cycle percentage. In this manner, should the calculated duty cycle percentage for any particular valve be greater than zero but less than the pre-set minimum, then the controller can be configured to assign to the valve the pre-set minimum based upon valve specifications and performance.

The controller can be configured to recalculate the flow factor for each valve multiple times during application of the liquid agricultural product. For instance, in one embodiment, the flow factor for each valve can be calculated at least once a second, such as at least five times a second, such as at least about 10 times a second.

In addition, the controller can be configured to determine valve position which can assist in inputting the flow related individual control values. For example, in one embodiment, the controller may include a subroutine that assigns physical locations to each valve based upon various inputs, such as valve spacing information that may be inputted by the operator.

In one embodiment, the controller can comprise a central hub wherein all the valves and inputs for the multiple flow related individual control values can be in direct electrical communication with the controller. In this manner, the electrical connections for the inputs and for the valves are "spokes" that are connected to the central hub. By having the controller be configured as the central hub, the controller can include battery power and a ground that can be shared by all system components. In one embodiment, the controller can operate at a Baud rate of less than about 150,000 Bd.

The controller can also include a graphic display that allows an operator to input flow related individual control values. The graphic display can also include various features. For instance, in one embodiment, the graphic display can be configured to graphically illustrate each valve and the rate at which the liquid agricultural product is being emitted from the valve.

The controller can also include a bypass system that bypasses all controls and operates any of the valves at a pre-set rate should an error be detected that is related to the valve.

As described above, the rate at which the agricultural product is dispensed from the valves is based upon a duty cycle percentage that is calculated by the controller. In some embodiments, it may be desirable to dispense the agricultural product from a valve at a particular point in time at a rate that is greater than the maximum flow capacity of the valve. Thus, in one embodiment, at least some of the valves may be used in conjunction with a non-pulsating valve to increase rates when desired. The non-pulsating valves can also be controlled by the controller.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 2 is one embodiment of a flow chart for calculating a manipulated flow signal when the system of the present disclosure is being retrofitted to a preexisting system;

FIG. 3 is one embodiment of a flow diagram for calculating the overall rate at which the liquid agricultural product is being dispensed;

FIG. 8 is a plan view of one embodiment of an interactive display that may be produced by the operator interface illustrated in FIG. 5;

FIG. 10 is a plan view of one embodiment of an interactive display that may be produced by the operator interface illustrated in FIG. 5;

Figure 1:
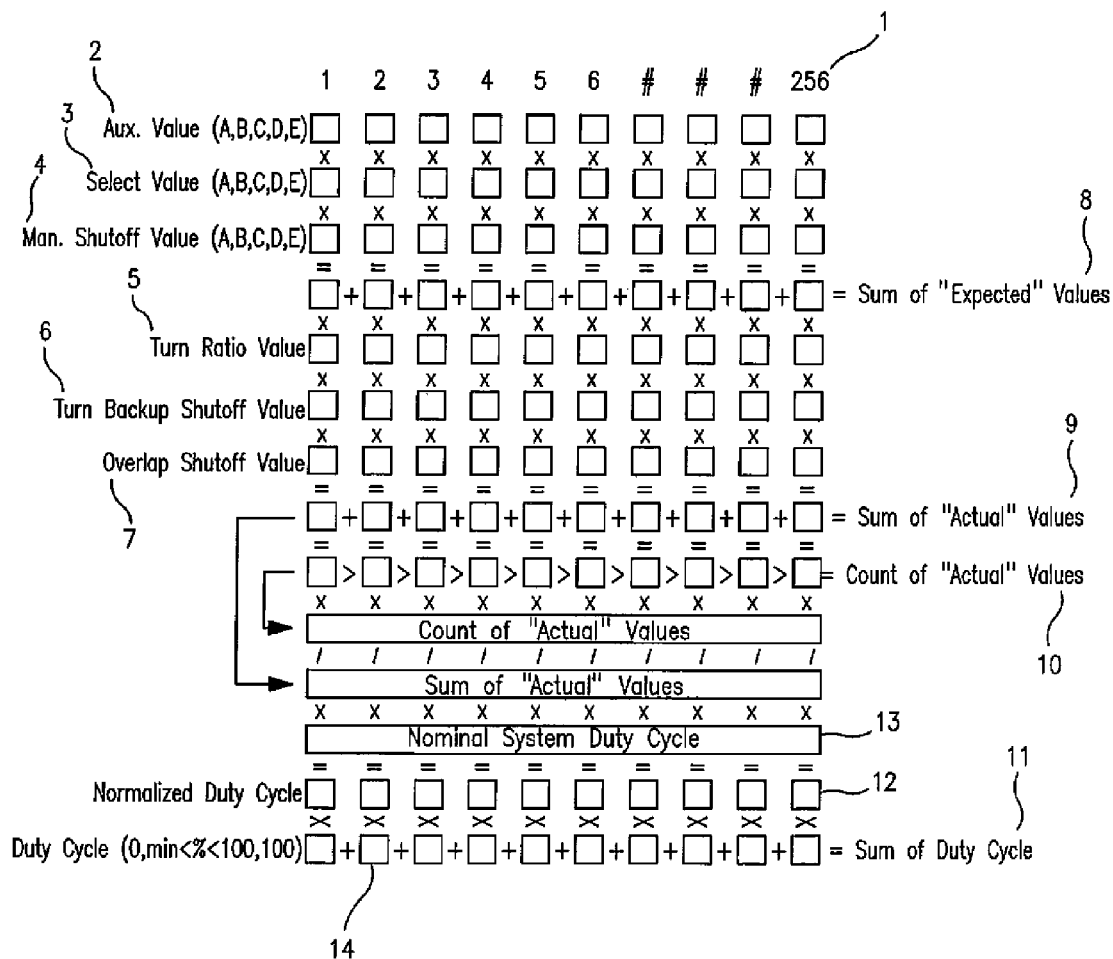
FIG. 1 is one embodiment of a flow diagram of a calculation map for calculating duty cycle percentages for valves controlled in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to a method and system for dispensing agricultural products from a plurality of valves. In one embodiment, the valves may comprise pulse width modulated valves. In accordance with the present disclosure, the system includes a controller that can control the valves individually based on input regarding any desired condition or parameter that may exist during application.

Thus, in one embodiment, the method and system of the present disclosure controls the individual actuated valves to varying rates. The overall average of individual valves or nozzle rates can be controlled to accommodate the independent flow and pressure objectives as desired. The individual valve rates, can be controlled to distribute more or less flow to sub-sections of the nozzle or valve group. Generally, for every valve that is high flowing there is another valve that is low flowing. In this manner, existing commercially available rate control equipment may continue to be used while being retrofitted with the system and method of the present disclosure, to provide the further benefit of finer control resolution. Since the on/off pulse ratio of each valve highly predicts the relative flow from each valve or nozzle, a control signal can be used without any feedback nor calibration to provide accurate distribution schemes within the overall global control parameters provided by these existing commercially available flow and pressure control systems.

Any input that is flow related may be used to distribute flow across a boom where the valves or nozzles are located. One such input that is easily understood is turn radius compensation. While turning, the outside nozzles on the boom travel much faster than the inside nozzles. The overall average of all nozzles will remain equivalent to the average vehicle speed as in existing systems, however the on/off pulse signal can be distributed to the nozzles across the boom according to the travel speed of each nozzle.

The distributed on/off signal or flow related individual control valves can come from external controllers as well. For instance, if multiple sensors are used across the boom to determine the rate of product required for a given job, the average can be sent to the commercially available systems for a single overall rate. The invention can then be employed to distribute the flow to each nozzle according to the sensor reading from each of the multiple sensors. In effect yielding finer application rate resolution without interrupting the existing overall rate control system.

The sensor or sensors that can provide information to the controller can vary depending upon various factors and the particular application. For instance, any suitable sensor capable of sensing a parameter or condition during application may be used. Such sensors can include speed detection devices, temperature sensors, vibration sensors, vegetative color sensors, soil electrical conductivity sensors, infrared soil organic matter sensors, moisture sensors, and the like.

This flow distribution can also come from a commercially available flow controller or otherwise which is preprogrammed with GPS maps that may want varying application rates for any number of predetermined reasons.

Since each pulsing valve also acts as a shutoff valve, the system can turn on or off individual valves or nozzles for any number of reasons. Using a GPS map, the position of each valve can be recorded as an application job is accomplished. As the valves cross an already applied portion of the field they can be turned off. Since the on/off pulse signal highly predicts the flow from the valve or nozzle, these overlap valves can be turned off and the commercially available rate control device manipulated to provide an accurate rate over a reduced swath width.

Overlap determination techniques are well documented in the prior art. However, the system of the present disclosure enables further control of individual flow distribution in a retrofit manner. Techniques are described below that allow for retrofit manipulation of a commercially available rate controller without interruption of the global control of flow and pressure.

The term "select" is used to describe user configured flow distributions for such benefits as extra rate on fence rows (to control weeds, etc.), extra rates over wheel tracks, extra rates on male vs. female plant rows, etc., where the rate distribution is constant within a boom swath.

A graphical user interface can be used to accommodate the large amount of data associated with the set-up, control, and monitoring of the system. At a glance the operator can see the flow relationship of each nozzle or valve and the total flow of the boom with respect to the maximum and minimum limits of the flow control system. The user interface offers buttons and menus to facilitate the input of data such as nozzle location, etc. Each automatic function of the controller is able to be disabled and run in manual mode, useful for troubleshooting and limping home after a component failure.

A system for power distribution to each nozzle or valve and a control component can be included to maximize current efficiency while being simple to install and manage. This "star" type configuration departs from traditional CAN bus techniques. Furthermore, the CAN system Baud rate can be reduced to increase reliability and extend physical length capabilities required for modern application equipment commonly 150 feet in swath.

The system and method of the present disclosure can be incorporated into various different systems. For instance, the system and method of the present disclosure can be used in conjunction with any of the systems and/or equipment disclosed in U.S. Pat. No. 7,311,044; U.S. Pat. No. 7,162,961; U.S. Pat. No. 5,967,066; U.S. Pat. No. 5,704,546; U.S. Pat. No. 5,653,389; U.S. Pat. No. 5,134,961; U.S. Pat. No. 7,398,137; U.S. Pat. No. 7,383,114; U.S. Pat. No. 7,184,859; U.S. Pat. No. 7,103,451; U.S. Pat. No. 7,079,981; U.S. Pat. No. 7,054,731; U.S. Pat. No. 6,928,339; U.S. Pat. No. 6,887,675; U.S. Pat. No. 6,813,544; U.S. Pat. No. 6,810,315; U.S. Pat. No. 5,919,242; U.S. Pat. No. 6,522,948; U.S. Pat. No. 4,630,773; U.S. Pat. No. 6,941,225; U.S. Patent Application Publication No. 2006/0273189; and U.S. Patent Application Publication No. 2008/0086249, which are all incorporated herein by reference.

Figure 11:
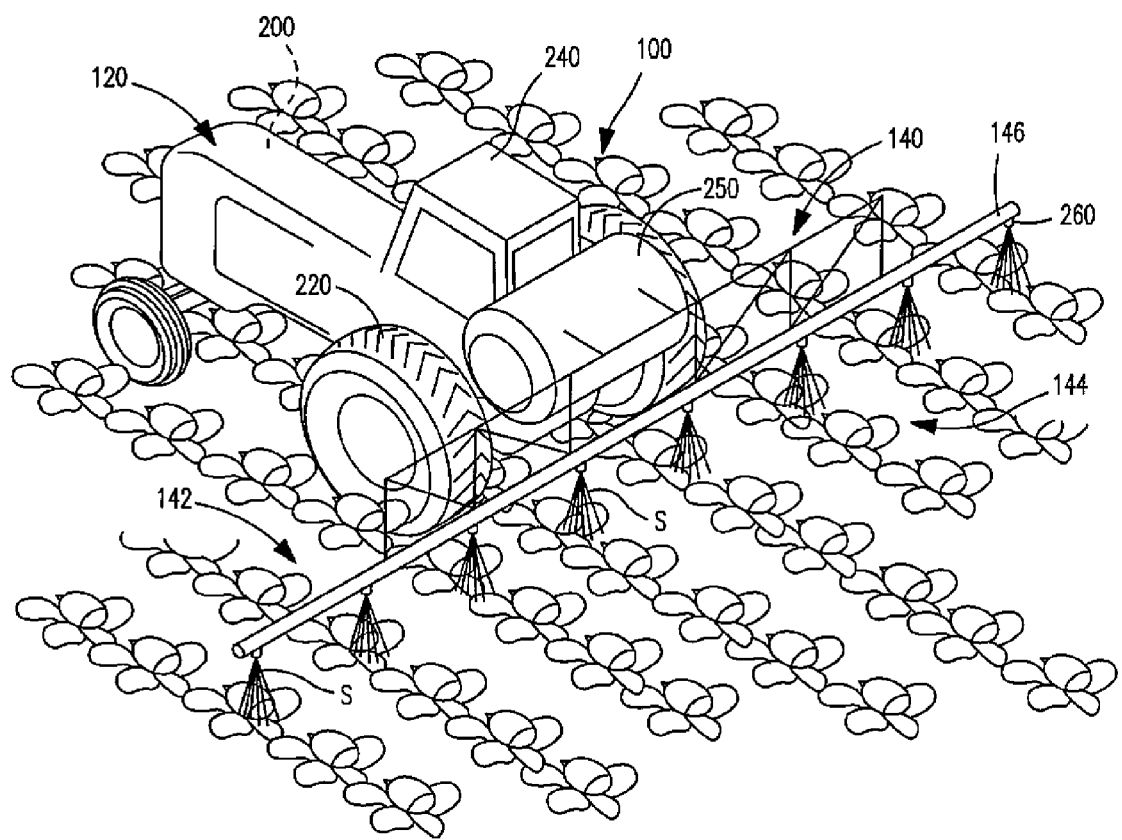
FIG. 11 is a perspective view of an embodiment of a system for dispensing an agricultural product in accordance with the present disclosure.

Referring to FIG. 11, one embodiment of a system for dispensing an agricultural product in accordance with the present disclosure is shown. The system 100 includes a tractor 120 to which a spray boom 140 is mounted for treating agricultural fields with a liquid agricultural product. In the embodiment illustrated, the agricultural product is dispensed as a spray S onto the field. It should be understood, however, that in other embodiments, the agricultural product may be injected into the soil as the tractor 120 traverses the field.

The tractor 120 includes an engine 200 and tires or wheels 220 to provide locomotion and a cab 240 in which an operator operates the system. The system includes a product reservoir 250, which is mounted on the tractor 120. The product reservoir 250 is in liquid communication with the boom 140. As shown, the boom 140 may include a left boom section 142 and a right boom section 144. A manifold 146 may run along the left boom section and the right boom section. The boom sections may, in one embodiment, correspond to soft booms, which are set up using a programmable map loaded into a controller as will be described in greater detail below. Further, the system may include more than two boom sections in which the valves in those sections are controlled as a group or individually.

Figure 12:
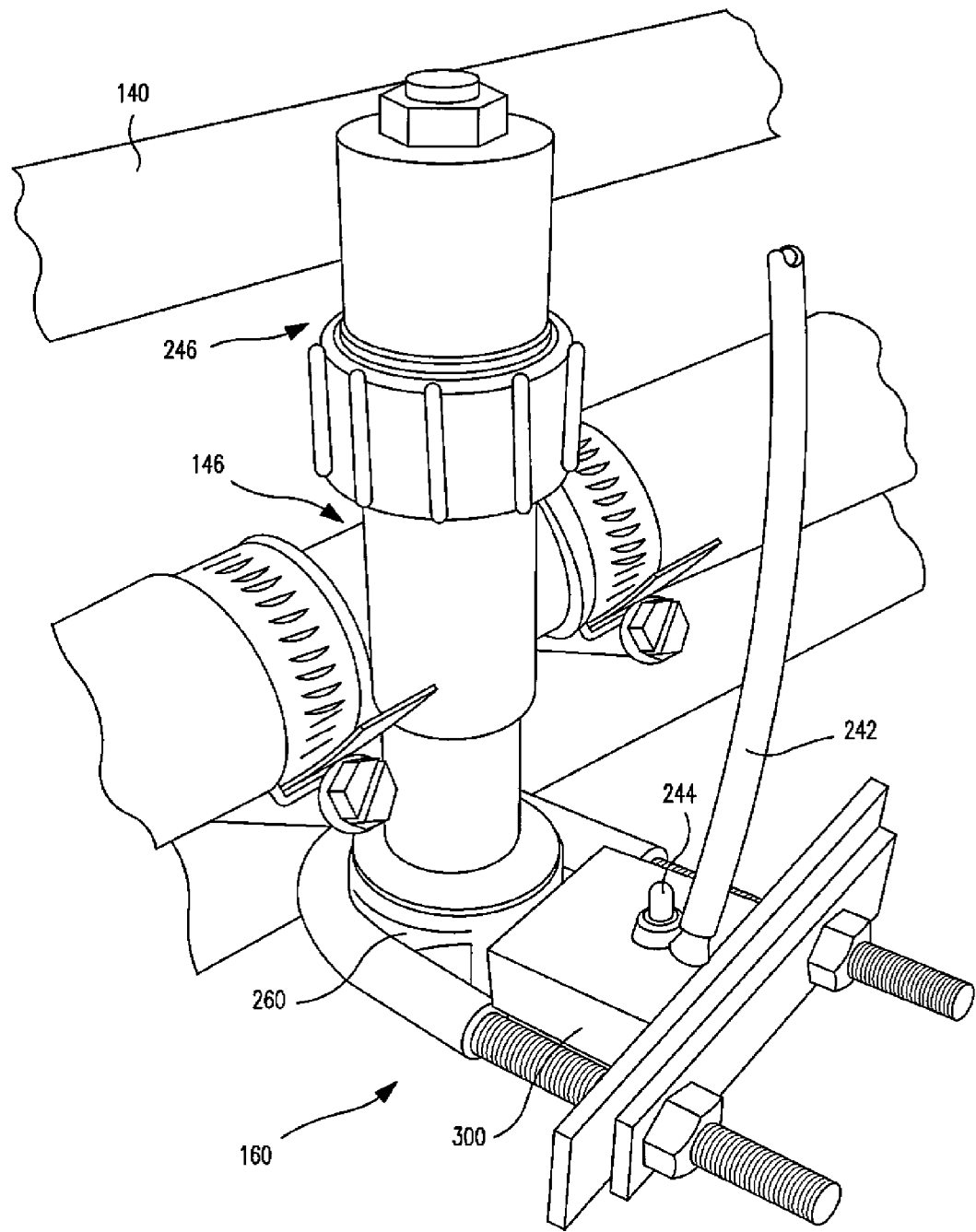
FIG. 12 is a perspective view of a valve assembly that may be used in the system of the present disclosure.

As shown in FIGS. 11 and 12, a plurality of valve assemblies 160 are spaced apart from each other on the manifold 146 for dispensing the agricultural product. Referring to FIG. 12, a valve assembly 160 is shown in more detail. The valve assembly 160 includes the valve 260 which can be coupled to any suitable device adapted to dispense the agricultural product. For example, in one embodiment, the valve 260 can be coupled to a nozzle for spraying a liquid product onto a field. In an alternative embodiment, the valve 260 may be coupled to an injector for injecting an agricultural product into the soil.

In one embodiment, the valve assembly 160 can include a module 300. In the embodiment shown, the module 300 is attached to the valve assembly 160. In an alternative embodiment, however, the module 300 can be more directly incorporated into the valve assembly.

The valve assembly 160 is in fluid communication with the manifold 146 for receiving the agricultural product from the liquid reservoir.

In one embodiment, the valve 260 may comprise a pulse width modulated valve. Such valves, for instance, are described in U.S. Pat. No. 5,967,066. Such valves can provide various advantages and benefits. For example, pulse width modulated valves are not only well suited to dispensing the agricultural product in controlled amounts, but can do so without significantly decreasing the pressure within the distribution manifold. Thus, when dispensing volatile liquids, such as ammonia, the valves can sustain back pressure and prevent vaporization.

As shown in FIG. 12, the valve 260 is in communication with an actuator 246. The actuator 246 pulsates between an open position and a closed position according to a duty cycle percentage. For instance, in one embodiment, the valve is controlled by an electrically actuated solenoid. In other embodiments, however, the valve may be pneumatically or hydraulically actuated. The term duty cycle percentage of the pulsating valve is defined as the percentage of time the valve is open divided by the total operation time. The duty cycle controls the flow rate of the fertilizer through the dispensing tubes in a rapid on/off manner. Such valves can also control various other parameters, such as droplet size, spray pattern, etc.

In the embodiment illustrated, the module 300 is used to connect the solenoid actuator to a controller for controlling the duty cycle percentage of the valve or other functions. As explained above, in one embodiment, the module can be a part of the solenoid actuator for direct connection to a controller. In the embodiment illustrated, however, the module includes an alarm, such as a visual alarm 244. In the embodiment illustrated, the alarm 244 comprises an LED. The LED is used to convey various information to the operator. For example, in one embodiment, the LED may indicate that the valve assembly has been registered by the controller and/or to indicate a problem associated with the particular valve.

Figure 13A:
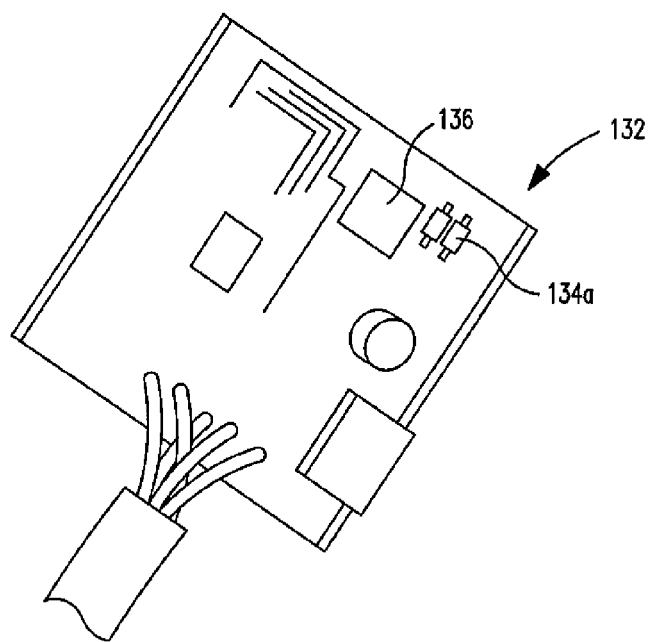
FIGS. 13a and 13b are perspective views of opposing sides of a circuit board that may be used in the valve assembly illustrated in FIG. 12.
Figure 13B:
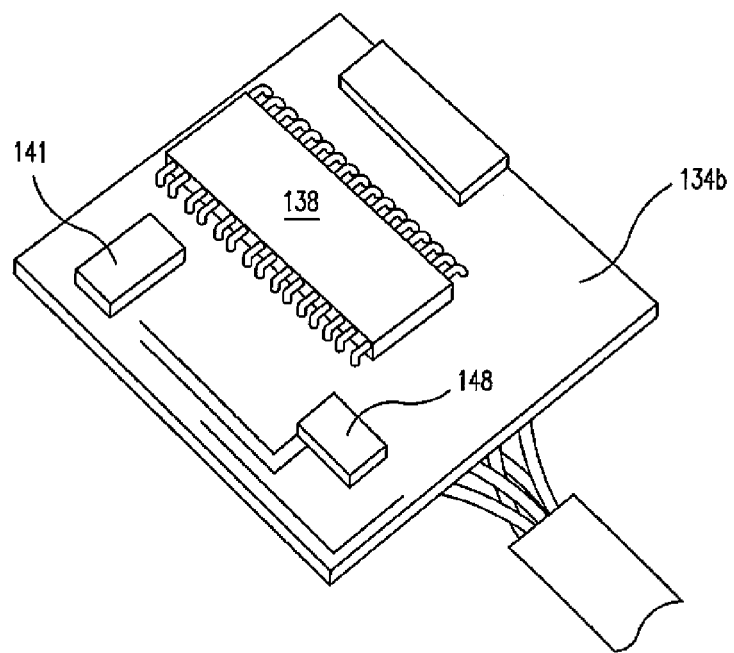

Referring to FIGS. 13a and 13b, in one embodiment, the control of the valve actuator can be done through a circuit board 132. The circuit board 132 can also be used to monitor the valve or nozzle. In one embodiment, the valve assembly can have an operational frequency range of from about 0 to about 15 Hz and can have a duty cycle range of from 0% to 100%. The circuit board 132 can include an analog circuit board side 134a and a digital circuit board side 134b. The analog side 134a, for instance, may include an accelerometer 136 with an amplification and filtering circuit for monitoring nozzle variation. The digital side 134b, on the other hand, can include a bus interface 148 and a microcontroller 138.

In addition to the above, the dispensing system 100 as shown in FIG. 11 can include various other components and devices. For instance, in one embodiment, the system 100 can include a flow meter placed between the liquid reservoir 250 and the distribution manifold. The flow meter can be used to monitor and/or control the amount of liquid agricultural product that is fed to the manifold. In one embodiment, the flow meter can send flow rate information to a controller for use in calculating duty cycle percentages in relation to the speed at which the valves are being traversed across the field.

Optionally, the system can also include a pressure regulator. The pressure regulator can be, for instance, a throttle valve that can be used for regulating the pressure of the liquid agricultural product within the system.

The particular liquid agricultural product that is dispensed through the system 100 as shown in FIG. 11 may vary dramatically depending upon the particular application and the desired results. The liquid agricultural product, for instance, may comprise a spray that is intended to come into contact with a crop, pest or soil. Each valve assembly can include a spray tip or nozzle to create and distribute spray droplets that carry the active ingredient within the spray to the target crop, pest or soil. In one embodiment, for instance, the liquid agricultural product may comprise a liquid fertilizer. The liquid fertilizer can be dispensed through any suitable soil engaging device such as a knife, coulter, or stream injector that carries the liquid fertilizer to the soil. In one particular embodiment, for instance, the liquid fertilizer may comprise a volatile liquid, such as anhydrous ammonia that is preprocessed by cooling or pressurization into a liquid state.

In an alternative embodiment, the liquid agricultural product may comprise irrigation water that may contain nutrients or chemicals. In still another embodiment, the liquid agricultural product may comprise a control agent, such as a pest control agent or a weed control agent.

As described above, the use of pulse width modulated valves can help to maintain pressure and can be used to establish spray droplet size. In one embodiment, the spray droplet size can be specific to a particular valve or nozzle in order to reduce the amount of off target drift or to enhance the spray coverage in a specific area. Nozzle or valve pressure can also be used to establish the velocity of the application stream at a specific site to control the amount of splash, or to control the depth of penetration into the soil, which is especially useful when injecting nutrients behind rolling coulters.

In accordance with the present disclosure, the system further includes various controls that can be sold as a stand alone system or can be easily retrofitted onto existing systems. In particular, the sum of the individual valve flows is controlled to achieve corporate flow and pressure objectives while the individual flow of each nozzle is controlled to achieve a specific flow distribution according to the product of multiple flow related steady state or variable objectives. More particularly, the system can include a controller capable of receiving various inputs. The inputs may comprise multiple flow related individual nozzle or valve control requirements or values for the valves. The flow related individual control values for the valves comprise unitless values that are proportional to each other and can be based upon any suitable parameter or condition regarding the application of the liquid agricultural product. The flow related individual control values, for instance, can be inputted into the controller by a user or operator or can be automatically inputted into the controller from a separate component or electronic device, such as a sensor or a global positioning system.

In accordance with the present disclosure, the controller is configured to multiply together the flow related individual control values for each valve. Each individual unitless value is then divided by the average of all individual valve or nozzle unitless values to create a flow factor for each valve or nozzle. The flow factor for each valve or nozzle can then be multiplied by a corporate pulse width modulation duty cycle percentage to achieve an unequal distribution of individual nozzle or valve flows that together meet the traditional corporate flow and pressure objectives.

Referring to FIG. 1, for instance, a flow chart and calculation map that illustrates various inputs that can be received by a controller in accordance with the present disclosure is shown. In addition, various calculations that can be performed by the controller in order to individually control each of the nozzles in the system are illustrated. As shown, the top row of numbers 1 represents each of the valves or nozzles contained within the system. For exemplary purposes only, in this embodiment, the calculation map indicates that up to 256 valves or nozzles can be identified in the system. Character numerals 2 through 7, on the other hand, identify various flow related individual control values that can be inputted for each of the individual valves. In this embodiment, for instance, the individual control values shown being inputted into the system include an auxiliary flow scalar value 2 for each valve, a select flow scalar value 3, a manual boom shutoff value 4, a turn radius scalar value 5, a turn backup shutoff value 6, and a nozzle or valve overlap shutoff value 7.

As described above, the system of the present disclosure is particularly well suited for being retrofitted with existing systems. In the calculation map illustrated in FIG. 1, the first three flow related individual control values 2, 3, and 4 for the valves represent values that are to be inputted to the system from a preexisting controller. The auxiliary value 2, for instance, may comprise a value inputted into the system from an external controller. The select value 3 and the manual shutoff value 4, on the other hand, may comprise operator inputted values that may be available on existing systems.

Flow related individual control values 5, 6 and 7, on the other hand, represent further controls that can be incorporated into the system of the present disclosure for more precise application based upon various system conditions and parameters. The turn ratio value 5, for instance, may comprise control values for each valve depending upon the velocity of the valve during a turn radius. The turn backup shutoff value 6, on the other hand, may be used to shutoff valves when it is sensed that the valves are moving backwards during application. The overlap shutoff value, on the other hand, may comprise a value for each of the valves depending upon a sensed overlap in application on the field.

Although the embodiment illustrated in FIG. 1 includes seven inputs for various flow related individual control values, it should be understood that the system may include more or less inputs for various other values. For instance, in one embodiment, the system can be designed to receive over ten individual control values for each valve, such as from about 10 to about 30.

As described above, the flow related individual control values are unitless values inputted into the system that are used to control the individual valves based upon a particular condition or parameter. In one embodiment, for instance, the individual control values can vary from about 0.1 to about 10. In this embodiment, a value of "1" would indicate that the valve during that particular condition or parameter is to operate according to a corporate duty cycle percentage. Based upon the parameter or condition, the control value can be increased or decreased for any given valve. Increasing the control value, for instance, indicates that the particular valve is to increase in flow rate according to a particular condition or parameter. An individual control value less than 1, on the other hand, translates into a decreased flow rate regarding the particular condition.

Although the individual control values are unitless, all of the values are proportional to each other for a particular condition or parameter. More specifically, the values are proportional to each other with respect to the amount or rate at which the liquid agricultural product is dispensed from each of the valves.

In some circumstances or conditions, it may also be desirable to temporarily or permanently shut off a particular valve during application. For instance, as shown in FIG. 1, it may be desirable to shut off a valve if it is indicated that the valve is moving backwards over a portion of the field where the agricultural product has already been applied. Similarly, it may be desirable to shut off a valve when the valve is moving forward but yet an overlap in application is detected. In order to cause a valve to shut off in accordance with the present disclosure, a "zero" is inserted into one of the individual control values. As will be made clear from a description of the calculations, inserting a zero into any of the control values will cause a valve to shut off at least temporarily until the zero value is replaced with a value greater than zero.

For instance, as shown in FIG. 1, once all of the multiple flow related individual control values are inputted into the system, the values are multiplied together for each valve. This multiplied value is inserted in row 9. As also shown, these values are then added together to create a sum of actual values 9. The controller can also be configured to count the number of actual values 10 which indicates the number of valves that are operating. By dividing the sum of actual values 9 by the count of actual values 101 an average control value is calculated for all of the valves.

As shown in FIG. 1, the multiplied value of the individual control values for each valve is then multiplied by the count of actual values 10 and then divided by the sum of actual values 9. In other words, the multiplied value for each valve is divided by the average control value for all the valves. This resulting number represents a flow factor for each valve. The flow factor can then be used to control each individual valve depending upon all the parameters and conditions that have been inputted into the system.

In one embodiment, for instance, a nominal or corporate system duty cycle percentage 13 can be inputted into the controller. The flow factor for each valve can then be multiplied by the corporate duty cycle percentage to arrive at a normalized duty cycle percentage 12. The normalized duty cycle percentage 12, in one embodiment, can then be compared to a pre-set minimum duty cycle percentage and/or pre-set maximum duty cycle percentage that may be inputted into the controller. For instance, in one embodiment, the system may be configured such that if a particular valve is to be on, that the duty cycle percentage not fall below a certain value, such as for instance 10%. Thus, if the normalized duty cycle percentage 12 is calculated to be less than 10%, the controller may be configured to automatically readjust the number to the minimum duty cycle percentage. This provides the actual or conditioned individual pulse duty cycle percentage 14 as shown in FIG. 1. The duty cycle percentage 14 as determined by the controller is then used by the controller to control the solenoids of each of the individual valves for dispensing agricultural product according to a desired amount. As described above, if any of the individual control values for any of the valves are zero, the pulse duty cycle percentage 14 as shown in FIG. 1 results in a zero which closes the valve entirely.

Through the above inputs and calculations, each valve in the system can be precisely controlled based upon multiple conditions and parameters that exist during application. Of particular advantage, the control values are all proportional to each other and when calculated according to the calculation map results in a single multiplied value that creates a proportional flow factor for interaction with a corporate duty cycle. Thus, in one embodiment, each of the valves or nozzles can be individually controlled regarding the rate at which the agricultural product is dispensed without changing the overall amount of product that is applied to the field. Further, as shown in FIG. 1, the system is particularly well suited to be retrofitted on existing systems that may only include a few controls for the valves.

As described above, various different flow related individual control values can be inputted into the system in accordance with the present disclosure. As an example, for instance, FIG. 1 includes a turn ratio value 5. This value, for instance, is one for each valve when the valves are all moving in a forward direction. When the vehicle or tractor undergoes a turn radius, however, the turn ratio values 5 change for the different valves depending upon the actual speed of the valves during the turn. For instance, individual nozzle or valve flow may be controlled for the actual speed that the valve or nozzle is traversing along the arc of the turn. In some instances, for instance, one or more of the valves may be traveling backwards during a turn. In accordance with the present disclosure, a value of zero can be assigned to the valve during the backwards movement in effect shutting the valve or nozzle to prevent an overlap in application. If the valve, however, increases in speed during the arc of the turn, the turn ratio value for that particular valve may be greater than one. For a valve that decreases in speed during the arc of the turn, on the other hand, the turn ratio value for that valve may be less than one. These types of values can be assigned to each of the valves depending upon other conditions and parameters.

In addition to a turn ratio value 5 as explained above, various other multiple flow related individual control values will now be described. It should be understood, however, that the following description is not exhaustive of the various values that can be incorporated into the system.

Other multiple flow related individual control values can include, for instance, irregular valve or nozzle spacing on the boom. In one embodiment, the multiple flow related individual control values may be related to a vehicle affect. For instance, increased or decreased application rates with respect to a particular valve may be needed due to wheel tracks caused by the vehicle, dust generation caused by the system, air disturbance caused by the system, and the like. Wheel tracks caused by a vehicle, for instance, may require greater amounts of a weed control agent. In particular, it has been discovered that weeds become more resilient where wheel tracks are located. Thus, when dispensing a weed control agent, it may be desirable to dispense greater amounts of the agent where the wheel tracks are located. In this regard, an individual control value for the wheel tracks can be inputted into the system based upon the valves that are located over where the tracks are formed.

In another embodiment, flow related individual control values can be inputted into the system that are related to one or more field affects. Field affects may require increased or decreased application rates due to the presence of fence rows, access roads, terrain, previous land usages, and the like. The presence of fence rows within a field, for instance, may promote the growth of a greater density of weeds. Thus, it may be desirable to apply greater amounts of a weed control agent along a fence row. In accordance with the present disclosure, this information can be manually inputted into the system or can be automatically inputted into the system. When automatically inputted into the system, for instance, a global positioning system may identify the presence of a fence row and modify the values of the valves located along the fence row accordingly.

In still another embodiment, one or more of the multiple flow related individual control values may relate to a vegetative affect. For instance, increased or decreased application rates from various nozzles or valves may be desired due to crop or weed density, crop or weed health, crop or weed species, crop or weed sex, or the like.

In still another embodiment, various multiple flow related individual control values may be inputted into the system based upon a global information system (GIS) rate prescription map, a field boundary map, or the like. A rate prescription map or a field boundary map, for instance, may be used to pre-set the valves for dispensing amounts of the agricultural product based upon the dimensions of the field or due to various geographical objects that may be present in the field. Rate prescription maps and field boundary maps, for instance, exist on preexisting commercial processes. Thus, these values may comprise the auxiliary values 2 as shown in FIG. 1.

In one embodiment, the system can include various sensors positioned along the boom that can input flow related individual control values into the controller. The sensors may include, for instance, vegetative color sensors, soil electrical conductivity sensors, infrared soil organic matter sensors, moisture sensors, and the like. Sensors may also be used to sense soil fertility and nozzle or valve pressure.

In still another embodiment, one of the multiple flow related individual control values may comprise a swath overlap value. For instance, if an area or part of the field is traversed that is known to have already been treated with the agricultural product, various individual valves or nozzles in the overlap area may be controlled to prevent overapplication of the agricultural product. The affected valves, for instance, can have a reduced flow rate or can be shut off in the overlap area. The presence of an overlap area can be predicted or determined using various different techniques and methods. For instance, the overlap system can be predicted or determined from GPS resolution, vehicle speed, turn radius, antennae offset, and the like. In one particular embodiment, for instance, a constant-curvature, constant-acceleration algorithm may be used to predict position while traversing between GPS coordinates. In an alternative embodiment, an accelerometer may be used in addition to GPS data to determine the forward/backward orientation of the vehicle such that the nozzle or valve location is accurately determined for use in overlap determination. In still another embodiment, a simple first-order dynamic model that uses machine geometry may be used to predict nozzle or valve position.

In still another embodiment, an electronic compass may be used in addition to GPS data to determine the forward/backward orientation of the vehicle such that nozzle or valve location is accurately determined for use in overlap determination.

In one embodiment, overlap calculations can be compared to an overlap safety margin that may be fixed or inputted by an operator. The safety-margin distance, for instance, may comprise a distance where some overlap is permitted. For instance, the safety-margin distance may vary in one application from 0 inches to about 36 inches. At 0 inches, the system will allow for no overlap. In other embodiments, however, the safety-margin distance may be a positive number that allows for some overlap in order to prevent skips or areas that remain untreated.

In one embodiment, the application overlap is determined by looking ahead along each predicted valve or nozzle position, to the right of each predicted valve or nozzle position, to the left of each predicted valve or nozzle position and behind each predicted valve or nozzle position according to a previously determined safety-margin distance for previously applied areas. The valves can be turned on or off depending on their predicted position relative to the previously applied area so that if the safety-margin distance calls for "no skips" then the valve shuts off inside the previously applied area by the safety-margin distance. If the safety-margin distance calls for "no overlaps", then the nozzle or valve shuts off before entering the previously applied area by the safety-margin distance.

In one embodiment, the accuracy of the overlap system will be predicted or determined as described above from GPS resolution, vehicle speed, turn radius, antennae offset, etc. and compared to an inputted overlap safety-margin expectation to sound an alarm and display a warning message that the overlap system is working within the expected accuracy margins or that the overlap system is outside of the expected accuracy margins such that the operator may adjust his expectations or disengage the overlap system and change to another method of overlap control.

For instance, the system can include controls that may prevent false determination of overlap. For example, false determination of overlap due to close proximity of adjacent valves or nozzles may be avoided by testing for adjacent nozzle overlap cases and ignoring those cases. False determination of application overlap due to small movement of nozzles along the application path may also be avoided by delaying the recording of "applied" regions until the nozzle or valve has passed completely away from the region and only then storing the applied region information.

The multiple flow related individual control values inputted into the system can change continuously as the valves traverse across the field. In this regard, the controller can continuously calculate flow factors for each valve during the process. In one embodiment, for instance, flow factors for each valve can be calculated at least once per second, such as from about 5 times to about 10 times per second.

Although pulse width modulated valves provide various advantages and benefits as described above, many of these types of valves may have capacity limitations. In some instances, it may be desirable to dispense greater amounts of the agricultural product at certain locations that are outside the capacity requirements of the pulse width modulated valves. In this regard, secondary valves can also be placed in conjunction with the pulsing valves to boost flow capacity.

In one particular embodiment, a non-pulsing solenoid valve may be used in conjunction with a pulsing valve such that when the pulsing valve is at its maximum flow capacity, the non-pulsing valve may be turned on to supplement the capacity of the pulsing valve. Furthermore, the system upon activation of the non-pulsing valve, may reduce the pulse duty cycle percentage of the pulsing valve to a mathematically determined duty cycle percentage equivalent to the maximum flow capacity of the pulsing valve. In this way, a seamless transition in flow results as the supplemental non-pulsing valve is added to and subtracted from the system. In one embodiment, multiple non-pulsing valves may be used to supplement the maximum flow capacity of a pulsing valve.

As described above, the system of the present disclosure can be easily retrofitted onto an existing system. When retrofitted onto an existing system, it may be necessary to intercept and modify the flow feedback signal from the preexisting controller to correct the signal for flow changes not considered in that preexisting controller's control algorithm. In effect, the preexisting rate controller will satisfy the traditional corporate flow and pressure objectives but will be decoupled from local requirements being controlled by the method and system of the present disclosure.

One flow diagram for intercepting and modifying the flow signal from a preexisting flow sensor is shown in FIG. 2. As shown, the flow signal intercepted from the preexisting flow sensor 16 is multiplied by the ratio of the sum of expected values 8 as shown in FIG. 1 to the sum of actual values 9 as also shown in FIG. 1. This ratio allows for correction of the multiple flow rated individual control values inputted into the system and contained in the flow factor for each valve that were not previously considered by the preexisting device.

For instance, a flow change that may not be considered by a preexisting rate controller may comprise shutting off individual nozzles or valves due to nozzle overlap as detected using any of the methods described above. As individual nozzles or valves are shut off, the preexisting rate controller's flow feedback device's signal will be corrected as if the individual nozzle had not been shut off. Hence, the corporate flow objectives will be met by the commercial rate controller while the local objectives will be met by the system of the present disclosure. In this case, any as-applied mapping done by the preexisting rate controller will be in error, however, the true as-applied application will be accurate.

Similarly, a flow change not considered by a preexisting rate controller may also comprise activities such as individual nozzles or valves being shut off when a tight turn radius is completed by a vehicle and where certain valves are traveling backwards as may be detected using GPS methods. The controller of the present disclosure, however, can correct the preexisting flow feedback device's signal so that the corporate flow objectives are met by the preexisting rate controller while the local objectives are met by the system of the present disclosure.

Once a valve or nozzle that has been turned off is reactivated, the controller of the present disclosure can activate the preexisting rate controller's remote implement shutoff switch, causing the commercial rate controller to consider the application started again.

As shown in FIG. 3, the controller of the present disclosure can also be configured to calculate a flow value that may be transmitted to a preexisting rate controller in a retrofit system. For instance, the total flow from the system can be mathematically calculated according to the sum of individual nozzle or valve flows as calculated from the individual valve pulse duty cycle percentages, individual valve solenoid valve orifice size, individual valve deposition orifice size, system pressure, and properties of the liquid being dispensed. This calculated flow can then be transmitted to a preexisting controller for feedback to control to the traditional corporate flow and pressure objectives.

As shown in FIG. 3, the calculated flow value 17, for instance, can be calculated by multiplying a flow constant for nozzle and product applied 18 by the square root of inlet and outlet nozzle pressure 19 and further multiplied by the sum of pulse duty cycle percentages 11 as shown in FIG. 1.

Figure 4:
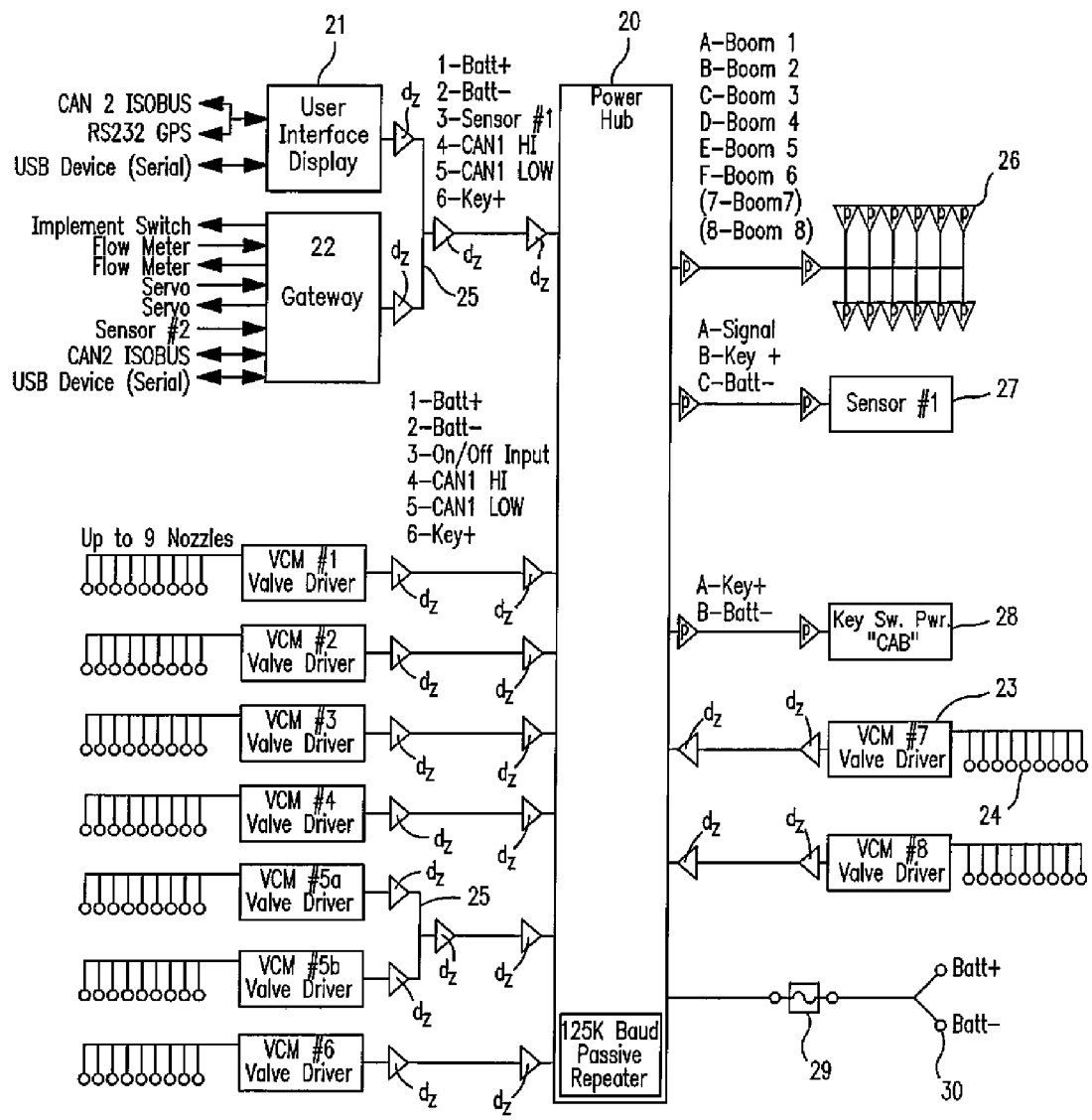
FIG. 4 is one embodiment of a flow chart and schematic diagram of a system made in accordance with the present disclosure.

Referring now to FIG. 4, one embodiment of a schematic diagram of a system made in accordance with the present disclosure is shown. As illustrated, in this embodiment, the controller can comprise a central hub 20 that distributes power, routing signals and repeating communications to all of the other components. As shown, the central hub or controller 20 is connected to an operator interface 21 which may include a display screen and controls used by an operator. The controller 20 is also connected to a gateway 22 for intercepting sensors and actuators in communicating with external controllers as listed. In this embodiment, the system includes eight different valve control modules 23 that control individual nozzle or valve pulses. The individual valves or nozzles 24 are in communication with a corresponding valve control module. In the embodiment illustrated, a single valve control module may be in communication with up to nine different valves. If desired, a Y cable 25 may also be used to allow for multiple component connections on a single port.

The system as shown in FIG. 4 can also include a shutoff adapter 26 for intercepting boom section shutoff signals from rate controllers. The shutoff adapter 26, for instance, can indicate when a group of valves on a particular section of the boom are shut off.

The controller 20 is further in communication with a pressure sensor 27 and an ignition input 28 for turning on or off the system components via a key switch.

The system can further include a circuit breaker 29 for current overload protection and various vehicle battery connections 30.

Having the controller 20 comprise a central hub in a "star design" may provide various advantages and benefits. As shown, power, CAN, analog and digital signals residing on individual circuits can be bundled into a single standardized cable, with the cables being connected to the central hub controller 20. The configuration shown in FIG. 4 is in contrast to various standard designs of CAN systems where nodes are interconnected in a "daisy-chain" fashion. The central hub configuration shown in FIG. 4, for instance, provides a more efficient distribution of non-CAN signals in conjunction with the CAN signals.

In addition, battery power and ground can be provided to each component in the system via the central hub 20. Connections are thus minimized maximizing the efficiency of power distribution. This design is especially beneficial when using a plurality of solenoid actuated valves which in some systems pose a large current load while individual solenoid performance is significantly impacted by voltage. Further, the switched ignition power 28 is provided to each component on the system via the central hub. Thus, a low current switched ignition voltage is used to power up and down each component on the system. This allows each component to possess its own high current battery power switch eliminating the need for a very large capacity battery power switch for the whole system at the battery location, thus reducing cost and making the power distribution design more efficient. In addition, a terminating resistor may be present within each component residing within the system. This eliminates the need for external terminating resistors and makes all components similar in design.

In one embodiment, CAN communications are provided to each component on the system via the central hub, where passive repeaters are used to accurately synchronize and distribute the CAN messages to and from each component.

A digital turn-on signal may be provided to each solenoid actuated valve module to facilitate boom section control in a common manner. As will be described in greater detail below, removing its functionality from the CAN allows for limp-home features greatly beneficial in agricultural applications where off-road and remote breakdowns are common and need to be addressed.

As shown in FIG. 4, an analog pressure sensor signal can also be transmitted from the central hub to the node responsible for pressure control. In the past, this functionality was typically placed with a CAN. Removing this functionality from the CAN reduces the number of nodes within the system and allows for common sensors and field troubleshooting techniques.

In order to assist in preventing communication errors, the CAN communication rate or Baud rate can be relatively slow. For instance, the Baud rate may be slowed down from a standardized rate (of commonly 250K) to a slower rate of less than about 150K Bd, such as at a rate of about 125K Bd. Slowing down the Baud rate facilitates longer cable lengths required on modern application equipment with swath widths nearly 200 feet in length. This slower Baud rate increases the robustness of the communications and reduces the risk of communication failures in the field.

During operation, the controller 20 can include an input or be programmed with a memory map of the field to be treated. As will be described below, the controller can also include a subroutine that locates the position of the valves or nozzles contained within the system. In accordance with the present disclosure, a 2-dimensional ring buffer technique may be used to allocate data memory storage locations such that the as-applied nozzle or valve position memory map is self-centering in both X and Y directions.

Figure 5:
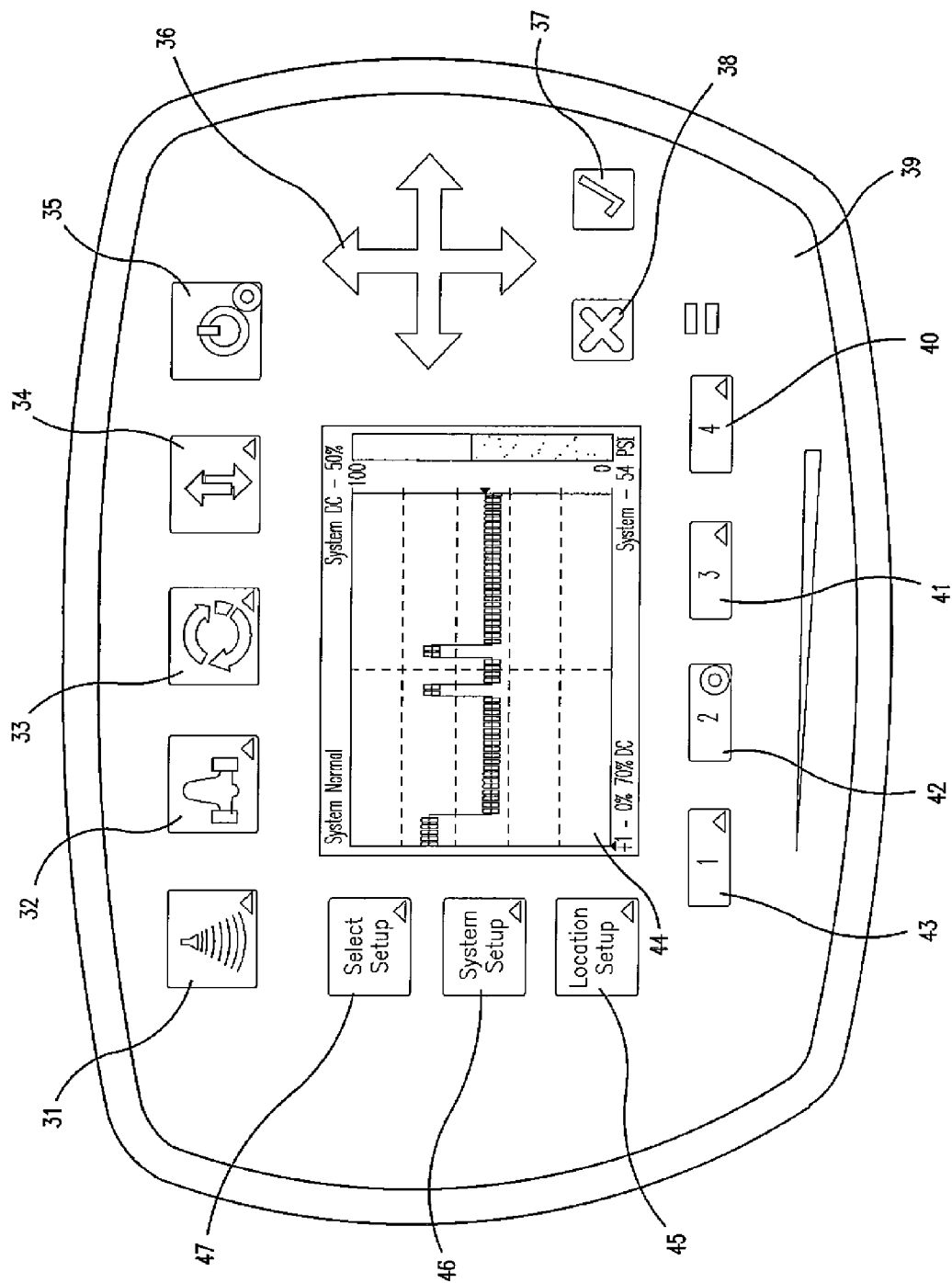
FIG. 5 is a plan view of one embodiment of an operator interface in accordance with the present disclosure.

Referring now to FIGS. 5-10, one embodiment of a user interface display 21 that may be incorporated into the system of the present disclosure is shown including a graphic display 44. As shown in FIG. 5, in addition to the graphic display 44, the operator interface 21 includes various operating lights and functions. For instance, the operator interface can include an Automatic/Manual Control Button and Indicator Light 31, an Alarm Enable/Disable Control Button and Indicator Light 32, a Turn Compensation Enable/Disable Control Button and Indicator Light 33, an Overlap Compensation Enable/Disable Control Button and Indicator Light 34, a System Enable/Disable Control Button and Indicator Light 35, a Cursor Navigation Control Buttons, Up/Down/Right/Left 36, an Enter Control Button 37, an Escape Control Button 38, a Touchpad Graphic Decal 39, a Select Control Button and Indicator Light #4 40, a Select Control Button and Indicator Light #3 41, a Select Control Button and Indicator Light #2 42, a Select Control Button and Indicator Light #1 43, a Location Set-Up Control Button and Indicator Light 45, a System Set-Up Control Button and Indicator Light 46, and a Select Set-Up Control Button and Indicator Light 47.

With respect to the operator interface illustrated in FIG. 5, the select control buttons 40, 41, 42 and 43, in one embodiment, can be preprogrammed to input multiple flow related individual control values for the valves into the system based upon the existence of a particular condition or parameter. For instance, in one embodiment, select control button 42, for instance, may be preprogrammed with individual control values for all the valves in the system in order to compensate for the presence of vehicle wheel tracks and a fence row.

Figure 6:
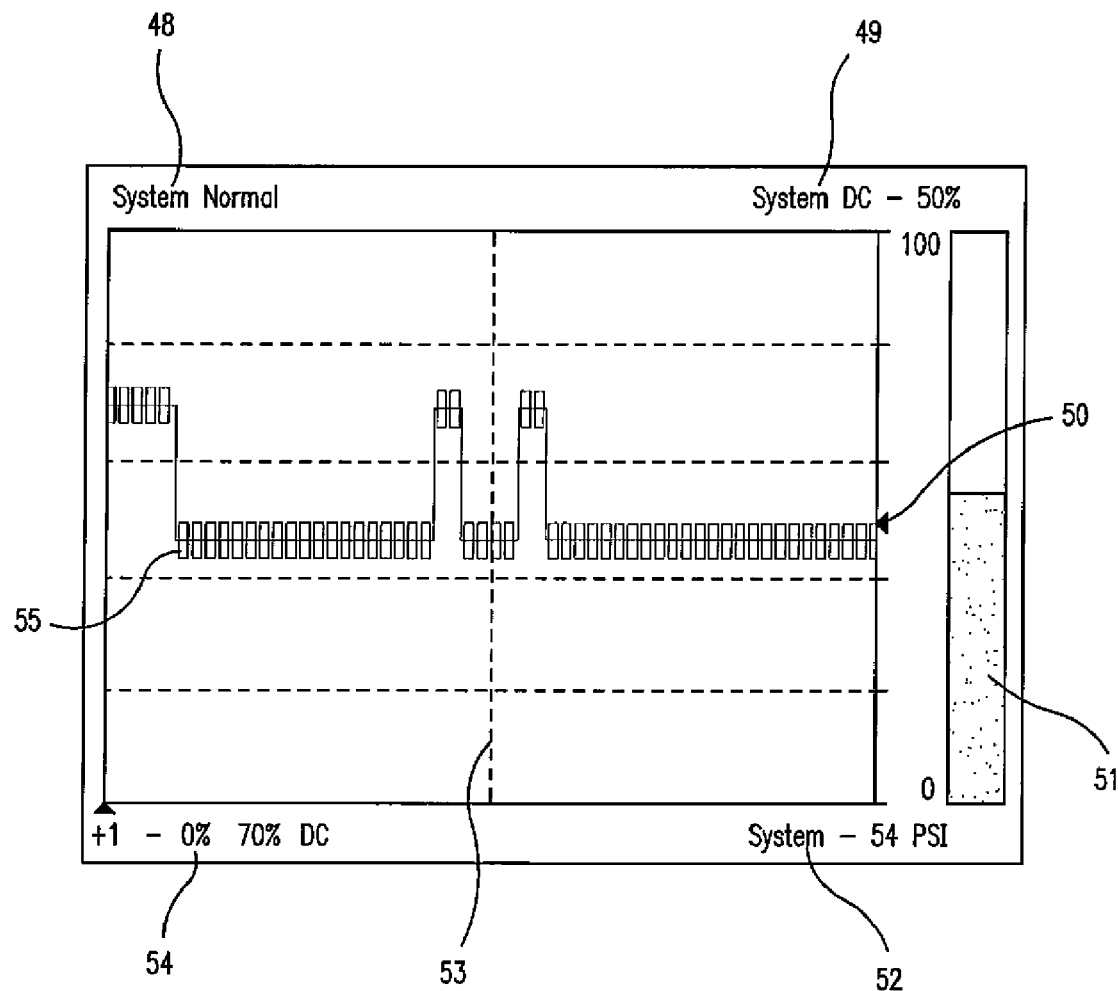
FIG. 6 is a plan view of one embodiment of a display screen that can be used with the operator interface illustrated in FIG. 5.

For instance, referring to FIG. 6, an operational mode screen is illustrated that includes a System Error Text Display Box 48, a System Nominal Pulse Duty Cycle Numerical Display Box 49, an Arrow Indicator Graphically Depicting #49 50, a System Pressure Graphical Indicator Depicting #52 51, a System Pressure Numerical Display Box 52, a Graphical Display Grid Lines To Assist in Graphical Comparisons of Data 53, a Valve Diagnostic Numerical Display Box 54, and a Nozzle Icon Graphically Depicting Location and Pulse Duty Cycle Percentage of each Nozzle 55.

More particularly, the nozzle icon location 55 illustrates not only the location of each valve or nozzle in the system but also shows the relative amount of the agricultural product being dispensed by the nozzles. As shown, a group of nozzles on the left hand side of the screen are emitting a greater flow rate than most of the remaining nozzles. Two groups of nozzles in the center of the screen are also emitting the agricultural product at a greater rate. The left hand side of the screen may show nozzles positioned along a fence row, while the middle groups of nozzles may show nozzles positioned over wheel tracks where greater amounts of the agricultural product may be desired. Thus, the system of the present disclosure can be equipped with a graphic display that allows an operator to check and make sure that the nozzles are operating according to a pre-set condition.

Figure 7:
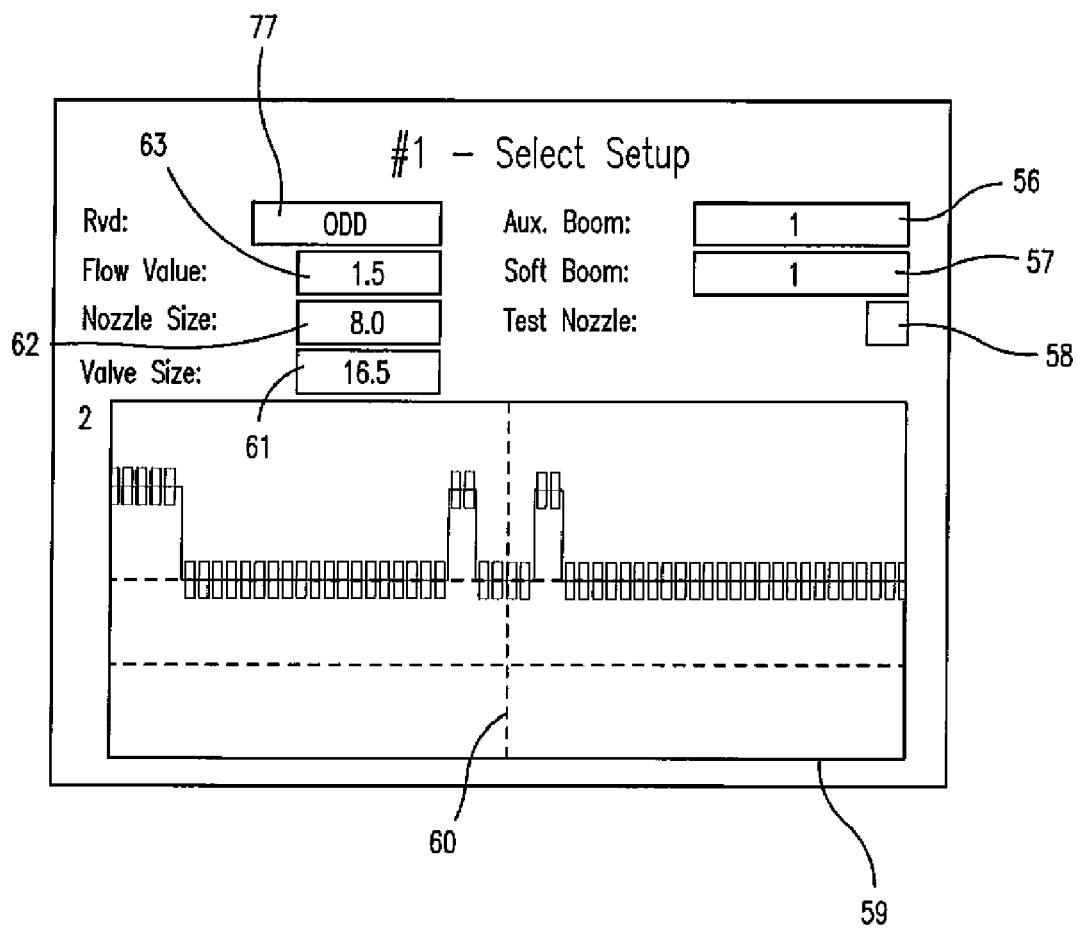
FIG. 7 is a plan view of one embodiment of an interactive display that may be produced by the operator interface illustrated in FIG. 5.

Referring to FIG. 7, a select setup screen is shown that may be used to program in the multiple flow related individual control values that result in the actual application rates as shown in FIG. 6. In one embodiment, for instance, each select setup screen may include an Auxiliary Boom Assignment Configuration Box 56, a Soft Boom Assignment Configuration Box 57, a Valve Test Assignment Configuration Box 58, a Nozzle Icon Graphically Depicting Location and Pulse Duty Cycle Percentage of Each Nozzle 59, a Graphical Display Grid Lines To Assist in Graphical Comparisons of Data 60, a Valve Size Data Entrance Box 61, a Nozzle Size Data Entrance Box 62, a Flow Scalar Value Data Entrance Box 63, and a Rank Value Data Entrance Box, Even/Odd/Open/Close 77.

In essence, the select set up screen as shown in FIG. 7 can be used to not only input multiple flow related individual control values for particular conditions or parameters, but can be used to preprogram the select control buttons 40-43 as shown in FIG. 5.

In one embodiment, the controller included in the system of the present disclosure can include a graphical depiction of individual valves or nozzles. The controller can also be configured to identify the actual physical locations of valves and nozzles. For instance, the controller may include a subroutine that assigns physical location measurements to each nozzle or valve to later be used in spacial calculations required to accurately dispense the agricultural product to the valves, In one embodiment, for instance, the controller can be configured to automatically assign physical locations to the valves based upon an operator inputting a valve spacing. The graphical display can then depict the individual valves as shown in FIGS. 6 and 7 which may then be used by the operator to identify the actual location of a single valve or a subset of valves. A valve or set of valves may need to be identified by the operator in order to input flow related individual control values. Alternatively, the actual location of a valve or a set of valves may be helpful where errors are detected by a diagnostic programming within the system. In this manner, the operator can efficiently inspect and service the specific valve or valves experiencing errors.

Referring to FIG. 8, a location setup screen that may be incorporated into the controller and that appears on the graphic display is shown. The location setup screen can include a VCM Serial Number Indicator Box 64, a VCM Identification Number Indicator Box 65, a VCM Nozzle Identification Indicator Box 66, a Location Indicator and Data Entrance Box 67, a Nozzle Element Number Indicator Box 68, and a Valve Test Assignment Configuration Box 69.

In the embodiment illustrated, the nozzle location is defined by the distance the nozzle is located from a center line extending perpendicular to the boom. A positive number, for instance, may indicate a valve positioned right of center, while a negative number may indicate the position of a valve left of center.

Figure 9:
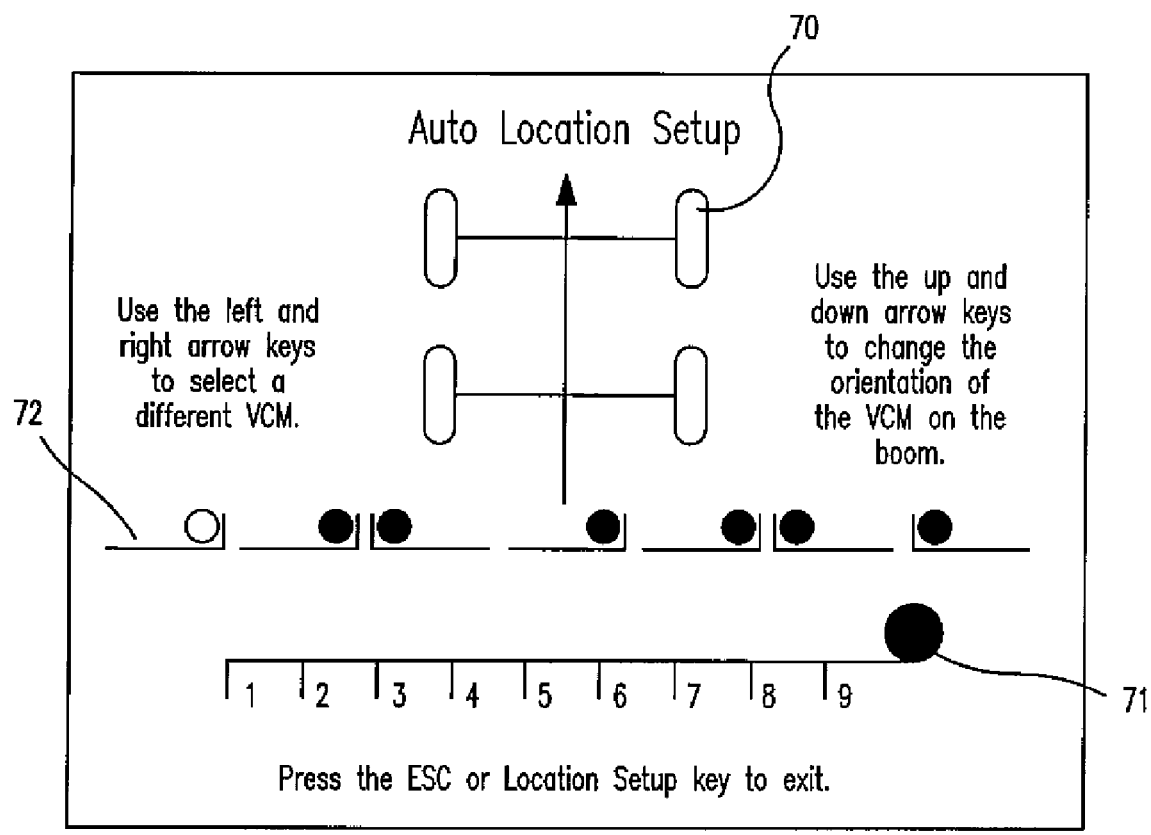
FIG. 9 is a plan view of one embodiment of an interactive display that may be produced by the operator interface illustrated in FIG. 5.

Referring to FIG. 9, an auto location setup screen is shown. The automatic location setup screen includes a Graphical Reference Depiction of Application Machine 70, a VCM Graphic of VCM being Configured 71, and a Graphic(s) of All VCMs in System Showing Position and Orientation of each VCM 72. The screen illustrated in FIG. 9 can be the screen shown during automatic positioning of the valve by the controller.

Referring to FIG. 10, a system setup screen is also shown that shows the various inputs that have been received by the controller regarding a standard menu. In this embodiment, the system setup screen includes a Set-Up Item Identification Number 73, a Set-Up Item Description 74, a Yellow Cursor Indicating Set-Up Item Being Selected and Configured 75, and a Set-Up Value 76.

As shown above, the graphical electronic display may be used to operate and set up the system such that a large amount of data required to operate the system is reduced to graphical elements that are easy for the operator to understand. In one embodiment, each valve or nozzle can be represented graphically by an icon placed spacially on the display screen horizontally according to each actual physical position on the application implement. This icon is placed spacially on the display screen vertically according to its actual pulse duty cycle percentage. The resulting graphical illustration shows individual nozzle performance as well as the performance of the plurality as a whole. The graphical depiction of individual nozzles and the plurality of nozzles is used to display the current operating conditions of the application device in real time. In addition, the graphical depiction of individual valves and the plurality of valves can be used to display user defined flow parameters to be saved in memory and later recalled for operation. This specific graphical depiction can be further used to identify and select the desired set of flow parameters from multiple saved sets of flow parameters.

In addition to the above, the controller and graphic display can be programmed with various other features and components. For instance, in one embodiment, the controller can be configured to automatically detect the available valves and to assign default setup data to the valves so that the system is fully operational, even without receiving any flow related individual control values for any of the valves. In this embodiment, a message may be displayed to the operator that the system is operating under default parameters and that application errors may occur if the system is not uniquely configured for the specific application at hand. In one embodiment, the operator may be required to push a button to continue, acknowledging that he is aware of the default operating parameters and the potential errors. The default system can provide for easy use of the system and may allow the system to be installed and tested in a generic environment where the final configuration of the valves may not be readily known.

The system can also include various emergency bypass features should system errors occur in the field. The bypass features, for instance, may allow the system to continue dispensing the agricultural product according to default amounts in the event of a terminal failure of the system. The terminal failure may occur for a single valve, a set of valves, or for the entire system. In this manner, the system can include a "limp-home" feature that allows an operator to continue to treat a field even when errors have been detected. The limp-home features can be automatically enabled upon the detection of errors or can be enabled manually by the operator.

In one embodiment, physically connected groups of valves or nozzles are wired to open and close in association with a conventional sprayer system being used for limp-home or emergency bypass mode to facilitate the starting and stopping of conventional flow, thereby permitting the operator to continue working unencumbered by the system. For example, actuators such as pumps, valves, etc. and sensors such as pressure sensors and flowmeters are wired to communicate directly with the conventional sprayer system being used for limp-home or emergency bypass mode to facilitate the control of flow by conventional means, when the system is being retrofitted onto a preexisting system.

In still another embodiment, the individual flow from each valve or nozzle may also be controlled by a remote control and/or wireless device. For instance, in one embodiment, individual nozzles or valves may be inspected for damage, wear or other performance related malfunctions including accuracy calibration, location verification and other system setup parameter verifications with the operator being physically located near the valve in question. In this manner, the valves and nozzles can be inspected and can be tested without the operator having to physically return to the main control console typically located in the vehicle pulling the boom in order to manually actuate the valve controllers each time a different valve or collection of valves is inspected.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A system for applying liquid agricultural products to a field comprising:
    a plurality of individually controlled pulse width modulated valves that are configured to emit a liquid agricultural product at a rate based on volume per time;
    a controller in communication with each of the valves, the controller being configured to receive multiple flow related individual control values for each valve, the controller being configured to multiply the individual control values together for each valve to create a multiplied value and to divide each resulting multiplied value by an average of all the multiplied values to create a flow factor for each valve; and
    wherein the controller controls the rate at which the liquid agricultural product is emitted from each valve based on the calculated flow factor for each valve.

2. A system as defined in claim 1, wherein the plurality of valves emit an overall application rate of the liquid agricultural product and wherein the controller is configured to vary the rate at which the liquid agricultural product is emitted from each valve based on changing flow factors without changing the overall application rate.

3. A system as defined in claim 1, wherein the rate that the liquid agricultural product is emitted from each valve is based on a duty cycle percentage that is calculated by the controller, and wherein the controller is configured to receive a corporate duty cycle percentage, the controller being configured to calculate the duty cycle percentage for each valve by multiplying the corporate duty cycle percentage by the flow factor for each valve.

4. A system as defined in claim 3, wherein the controller is configured to close a valve that has a calculated duty cycle percentage of zero.

5. A system as defined in claim 4, wherein the controller is programmed with a pre-set minimum calculated duty cycle percentage, and wherein the controller is configured to assign the pre-set minimum calculated duty cycle percentage to a valve that has a calculated duty cycle percentage greater than zero and less than the pre-set minimum.

6. A system as defined in claim 1, wherein the controller is configured to close a valve when any of the multiple individual control values for the valve are zero.

7. A system as defined in claim 1, wherein the controller is configured to calculate the flow factor for each valve at least once a second.

8. A system as defined in claim 1, wherein the valves are mounted on a boom that is configured to be traversed across a field by a vehicle.

9. A system as defined in claim 1, wherein one of the flow related individual control values comprises a valve turn radius comprising a value based on a speed of each valve while the valve is traversing along an arc of a turn.

10. A system as defined in claim 1, wherein the flow related individual control values for the valves comprise unitless values that are proportional to each other and are based upon the amount of liquid agricultural product that is emitted by each valve for a certain condition.

11. A system as defined in claim 1, wherein one of the flow related individual control values is based upon irregular valve spacing.

12. A system as defined in claim 1, wherein one of the flow related individual control values comprises an increased or decreased application rate over wheel tracks produced by a vehicle that is used to traverse the valves over a field.

13. A system as defined in claim 1, wherein one of the flow related individual control values comprises an increased or decreased application rate due to a field affect, the field affect comprising the presence of a fence row or an access road.

14. A system as defined in claim 1, wherein one of the flow related individual control values comprises an increased or decreased application rate due to a vehicle affect, the vehicle affect comprising wheel tracks, dust generation, air disturbance, or mixtures thereof.

15. A system as defined in claim 1, wherein one of the flow related individual control values comprises an increased or decreased application rate due to a vegetative affect, the vegetative affect comprising a crop or weed density, a crop or weed health, a crop or weed species, a crop or weed sex, or mixtures thereof.

16. A system as defined in claim 1, wherein one of the flow related individual control values comprises a location of a valve on a global information system prescription map or on a field boundary map.

17. A system as defined in claim 1, wherein one of the flow related individual control values comprises a swath overlap.

18. A system as defined in claim 17, wherein the swath overlap values are calculated for each valve or for a group of valves from input received from a global positioning system.

19. A system as defined in claim 18, wherein the swath overlap values are further calculated based on a speed at which the valves are moving, a turn radius of the valves, and an antennae offset.

20. A system as defined in claim 18, wherein the swath overlap values are further calculated from input received from an electronic compass.

21. A system as defined in claim 18, wherein the swath overlap values are determined by looking ahead along each predicted valve position, to the right of each predicted valve position, to the left of each predicted valve position, and behind each predicted valve position according to a user selected safety-margin distance.

22. A system as defined in claim 18, wherein a constant-curvature, constant-acceleration algorithm is used to predict valve position while traversing between global positioning system coordinates.

23. A system as defined in claim 17, wherein the controller is programmed with a memory map for determining valve locations, and wherein the controller uses a two-dimensional ring buffer method to allocate data memory storage locations such that valve position on the memory map is self-centering in X and Y directions.

24. A system as defined in claim 17, wherein a first-order dynamic model that uses machine geometry is used to predict valve position for determining swath overlap.

25. A system as defined in claim 17, wherein false determination of swath overlap due to close proximity of adjacent nozzles is avoided by testing for adjacent nozzle overlap cases and ignoring those cases in determining swath overlap.

26. A system as defined in claim 17, wherein false determination of swath overlap due to small movement of valves along an application path is avoided by delaying a recording of previously treated regions until the valve has passed completely away from the region and only then storing the treated region information in the controller.

27. A system as defined in claim 17, wherein the controller is programmed with an overlap safety margin and wherein a swath overlap is calculated and compared to the overlap safety margin, the system further including a display that indicates that the calculated swath overlap is working within expected accuracy margins or that the calculated swath overlap is outside of expected accuracy margins.

28. A system as defined in claim 27, wherein the controller automatically adjusts the overlap safety margin relative to a predetermined overlap safety margin expectation.

29. A system as defined in claim 1, wherein the flow related individual control values comprise at least one of a value related to soil fertility, soil conductivity, or valve pressure.

30. A system as defined in claim 1, wherein groups of the valves are given the same multiple individual control valves such that the groups are controlled together.

31. A system as defined in claim 1, wherein the controller comprises a central hub and wherein all of the valves and inputs for the multiple flow related individual control values are in direct electrical communication with the controller.

32. A system as defined in claim 31, wherein the central hub includes battery power and a ground that is provided to each of the valves and inputs.

33. A system as defined in claim 1, wherein the controller operates at a Baud rate of less than about 150,000 Bd.

34. A system as defined in claim 1, wherein the controller includes a graphic display that allows an operator to input flow related individual control values.

35. A system as defined in claim 34, wherein the graphical display is configured to graphically illustrate each valve and the rate at which the liquid agricultural product is being emitted from the valve.

36. A system as defined in claim 1, wherein the controller includes a subroutine that assigns physical locations to each valve to assist in assigning multiple flow related individual control values for the valves.

37. A system as defined in claim 1, wherein at least certain of the individually controlled pulse width modulated valves are used in conjunction with a non-pulsating valve.

38. A system as defined in claim 1, wherein the controller includes a bypass system that bypasses all controls and operates any of the valves at a pre-set rate should an error be detected that is related to the valve.

39. A system as defined in claim 1, wherein the system is retrofitted to a preexisting rate controller and wherein the system is configured to intercept and modify a signal from the preexisting rate controller in order to correct the signal for flow changes in the system that are not inputted into the preexisting controller.

40. A method for applying liquid agricultural products to a field comprising:
dispensing a liquid agricultural product through a plurality of individually controlled pulse width modulated valves, the liquid agricultural product being dispensed from each valve at a rate that is based upon a duty cycle percentage applied to the valve, the liquid agricultural product being dispensed onto a field at a total rate based on a corporate duty cycle percentage for all of the valves;
assigning multiple flow related individual control values for each valve, the flow related individual control values comprising unitless values that are assigned to each valve based upon a condition or parameter, the individual control values for each condition or parameter being proportional to each other;
multiplying the individual control values together for each valve to create a multiplied value and dividing each resulting multiplied value by an average of all the multiplied values to create a flow factor for each valve; and
setting the duty cycle percentage for each valve based upon multiplying the flow factor for each valve times the corporate duty cycle percentage.

* * * * *